United States Patent
Kasten et al.

(10) Patent No.: US 8,799,409 B2
(45) Date of Patent: Aug. 5, 2014

(54) SERVER SIDE DATA CACHE SYSTEM

(75) Inventors: Christopher J. Kasten, Rancho Cordova, CA (US); Vilas Athavale, San Jose, CA (US); Tim Kane, Roseville, CA (US); Haili Ma, Folsom, CA (US); Naga Mayakuntla, Rancho Cordova, CA (US); Frederick Ty, Cupertino, CA (US); Scott Molenaar, Folsom, CA (US)

(73) Assignee: eBay Inc., San Jose, CA (US)

( * ) Notice: Subject to any disclaimer, the term of this patent is extended or adjusted under 35 U.S.C. 154(b) by 741 days.

(21) Appl. No.: 12/688,732

(22) Filed: Jan. 15, 2010

(65) Prior Publication Data

US 2010/0180208 A1 Jul. 15, 2010

Related U.S. Application Data

(60) Provisional application No. 61/145,109, filed on Jan. 15, 2009.

(51) Int. Cl.
*G06F 15/16* (2006.01)

(52) U.S. Cl.
USPC .......................................... 709/219; 711/118

(58) Field of Classification Search
CPC ............. H04L 67/2814; H04L 67/2885; H01I 67/2842; G06F 12/0811; G06F 12/0888
USPC ......... 709/203, 245, 228, 213, 217, 219, 240; 707/10; 711/118
See application file for complete search history.

(56) References Cited

U.S. PATENT DOCUMENTS

| | | | |
|---|---|---|---|
| 6,601,090 B1 * | 7/2003 | Gurijala et al. | 709/213 |
| 6,772,225 B1 * | 8/2004 | Jennings et al. | 709/240 |
| 6,785,769 B1 * | 8/2004 | Jacobs et al. | 711/118 |
| 7,035,911 B2 * | 4/2006 | Lowery et al. | 709/217 |
| 7,080,158 B1 * | 7/2006 | Squire | 709/245 |
| 7,363,340 B2 * | 4/2008 | Agarwalla et al. | 709/203 |
| 7,526,530 B2 * | 4/2009 | Thomason | 709/217 |
| 2003/0120752 A1 * | 6/2003 | Corcoran | 709/219 |
| 2004/0117486 A1 * | 6/2004 | Bourne et al. | 709/228 |
| 2006/0106807 A1 * | 5/2006 | DeVitis et al. | 707/10 |
| 2006/0155857 A1 * | 7/2006 | Feenan et al. | 709/227 |
| 2007/0250513 A1 * | 10/2007 | Hall et al. | 707/10 |

* cited by examiner

*Primary Examiner* — Dustin Nguyen
(74) *Attorney, Agent, or Firm* — Schwegman Lundberg & Woessner, P.A.

(57) ABSTRACT

In an example embodiment, a system and method to store and retrieve application data from a cache and a database are provided. The example method may comprise receiving location data associated with application data from a user device, using the location data to determine a cache or database on which the application data is stored, and requesting application data from the cache or database. The system and method may further include monitoring requests for application data associated with instructions having a set of characteristics, identifying application data as associated with the instructions having the set of characteristics, and requesting the application data based on receiving subsequent instructions sharing the same set of characteristics.

19 Claims, 5 Drawing Sheets

SERVER SIDE DATA CACHE SYSTEM

CROSS-REFERENCE TO A RELATED APPLICATION

This application claims the benefit of U.S. Provisional Patent Application entitled "Server Side Data Cache System," App. No. 61/145,109, filed Jan. 15, 2009, the entire content of which is herein incorporated by reference in its entirety.

TECHNICAL FIELD

The present application relates generally to the technical field of data storage and retrieval. In particular, but not by way of limitation, the present application discloses techniques for allowing data to be stored in a cache.

BACKGROUND

As the number of web-based applications and services continues to grow, so do the demands placed upon database systems supporting such services and applications. Not only that, web-based applications and services continue to evolve and perform new and exciting functions.

Cookies are used to support web-based applications and services; however, they have several limitations. For example, a browser may only support a certain number of cookies per domain, a certain number of cookies total, and a certain maximum size of a cookie. Use of cookies may also implicate privacy and security concerns.

To support their functions and capabilities, web-based applications and services generally rely on application servers and databases. Computer users generally interact with a web site through an application server connected to one or more databases to perform functions supported by a particular Web-based application and service. However, the number of database requests may become so great or cause such great load on the database that supporting these requests and maintaining a reasonable response time to the user may become cost prohibitive or extremely complex to maintain and manage.

BRIEF DESCRIPTION OF THE DRAWINGS

Some embodiments are illustrated by way of example and not limitation in the figures of the accompanying drawings in which.

DETAILED DESCRIPTION

In the following description, for purposes of explanation, numerous specific details are set forth in order to provide a thorough understanding of one or more embodiments of the present invention. It will be evident, however, to one skilled in the art that the present invention may be practiced without these specific details. Example embodiments are illustrated by way of example, and not by way of limitation.

In various example embodiments, systems and methods are shown that include storing application data, including data that may be found in a browser cookie, on one or more caches. This application data may be stored on one or more databases and cached in one or more caches to enable possibly more efficient access to the application data by one or more application servers. A client machine may store location data containing information that may indicate on which cache and which database certain application data may be located. For example, when the system receives a command from a client machine, the system may use location data associated with the command in order to locate and retrieve the application data associated with the command. Location data may be any data or value that is used to locate application data not stored on the user device.

Application data may comprise any data associated with a command or command's application. For example, application data may include session data, state information, user profile information, data used by websites, or variable data. In one embodiment, the application data may be of a certain type, where the type corresponds to the scope of the data (e.g., scope is limited to a browser session, a domain, a set of domains, a user, an authentication session, etc.). Each type of application data may have its own set of characteristics. Related application data may also be grouped together and accessed using an identifier.

Figure 1:
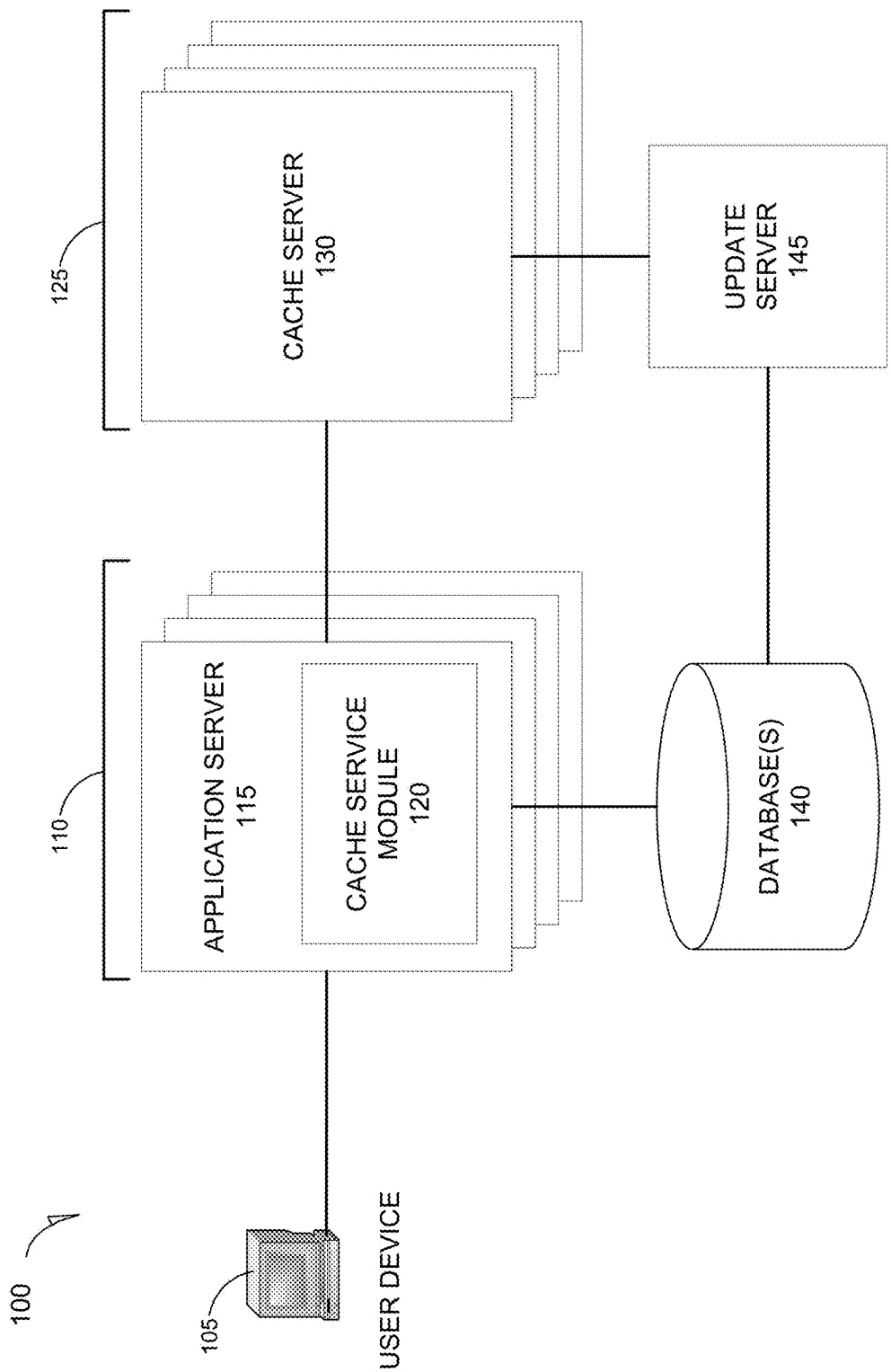
FIG. 1 is a block diagram illustrating a system to store application data in one or more caches, according to various embodiments.

FIG. 1 is a block diagram illustrating a system to store application data in one or more caches, according to various embodiments. System 100 may be shown to include one or more user device 105, one or more application servers 110, one or more cache servers 125 supporting one or more caches, one or more database servers supporting one or more databases 140, and an update server 145. A database is any stored collection of data. A database may be split into one or more smaller databases and stored in one or more database servers. A cache or cache tier may comprise a collection of data or subset of the collection of data that is duplicated and stored elsewhere, for example, in the database. The cache may operate as a temporary storage area where data may be accessed. In one embodiment, accessing data on the cache is less expensive, in terms of time and other resources, than accessing data via the database. The cache also may be split into one or more smaller caches stored on one or more cache servers.

The user device(s) 105, application servers 110, cache servers 125, and update server 145 may all be at different locations and configured to communicate with each other. For example, each user device of the user devices 105 may communicate with any of the application servers 110, each application server of the application servers 110 may communicate with any of the cache servers 125, and each cache server may communicate with any of the databases 140. The user device 105, application servers 110, cache servers 125, and update server 145 may communicate through the Internet via a network interface, through wireless communications such as through a mobile phone network, or other communication means.

In an example embodiment, a user device 105, such as a computer, mobile phone, server, or other communications device, may transmit instructions to perform an activity, such as a command or functionality associated with an application, to any one of the application servers 110. Each application server may perform or implement one or more activities. The user device 105 may determine to which application server 115 to transmit the instructions based on activity to be performed. These activities, commands, functionalities, or applications may be related to web applications. However, in other embodiments, they may relate to non-web applications, mobile device applications, or cloud computing applications.

An application server 115 may need additional application data to perform an activity, such as a command, functionality, or application. The application server 115 may also need to store data associated with the activity at a location that is accessible to multiple application servers 110. The application server 115 may use a cache service module 120 to request the additional application data or store new or modified application data. In one embodiment, the cache service module 120 may be included in the application server 115. The cache service module 120 may determine on which cache the requested application data reside. For example, the cache service module 120 may receive location data associated with the instructions received from the user device 105 and use the location data to determine on which cache the requested application data reside. The location data may be stored on the user device 105 and included in the communication received from the user device 105. For example, in one embodiment, the location data is a browser cookie received from the user device 105. The location data may include one or more cache identifiers identifying the cache or caches on which the requested application data may reside. A cache identifier may be any value or identifier that may be used to uniquely identify a cache. The cache service module 120 may also determine on which database the requested application data reside. For example, the associated location data may also include one or more database identifiers identifying the database or databases that the requested application data may reside on.

In another embodiment, the location data, cache identifier, or database identifier may include a routing identifier. A routing identifier may be any value or variable that may be used to find the cache that the requested data may reside on, the database that the requested data may reside on, or both. For example, a routing identifier may be a user identification or other unique identifier that may be used by the cache service module to query a routing service to determine a cache associated with the user identification or other unique identifier. Similarly, the routing identifier may be used to look up the appropriate database. The routing service may be a routing table, routing database, or other service that stores routing information and may identify a cache or a database associated with the routing identifier. In one embodiment, the routing identifier may be included in a browser cookie received from the user device.

After determining the appropriate cache the requested application data may reside on, the cache service module 120 requests the data from the cache. In an embodiments where the cache is implemented on a cache server 130, the cache service module 120 requests the data from the cache server 130. If the requested data is stored on the cache server 130, the cache server 130 provides the cache service module 120 the data for the application server 115 to use. If the requested data is not in the cache server 130, the cache server 130 may send the cache service module 120 a "miss" signal or other response indicating that the requested data is not on the cache server 130.

In response to receiving a response indicating that the requested data is not on the cache server 130, the cache service module 120 may request the data from the appropriate database 140. In embodiments where the database 140 is implemented on a database server, the cache service module 120 requests the data from the database server on which the database 140 resides. If the requested data is stored on the database server, the database server provides the cache service module 120 the data for the application server 115 to use.

In one embodiment, if the requested data is not found in the cache indicated by the location data, the cache service module 120 may write the requested data to the cache server 130 containing the indicated cache so that subsequent requests for the requested data may be handled by the cache server 130. In another embodiment, if the application server 115 or user device 105 modifies the requested application data, the cache service module 120 may write the modified application data to the cache server 130 after the data is modified so that an updated version of the application data is in the cache server 130.

In one embodiment, an update set may be used to enable the cache service module 120 to write only a subset of the application data associated with the location data back to the cache server 130. An update set may be an identification of a subset of all of the application data associated with the location data. For example, an update set may identify one or more pieces of application data that are modified and are to be written back to the cache server 130. In this way, all of the pieces of application data retrieved do not need to be written back to the cache server 130 if only a subset of the pieces of application data have been modified.

In some embodiments, if the requested data is not on the database corresponding to the database identifier, the database server that implements the database 140 may send the cache service module 120 a "miss" signal or other response indicating that the requested data is not on the database 140. The cache service module 120 may create a new data object of the same type as the requested application data and return the new data object to the application server 115. The cache service module 120 may then transmit the new data object to the cache server 130 to be stored in the cache. In one embodiment, to preserve the data in the database 140, the new data object may not be used to overwrite data stored in the database 140. Instead, the new data object may remain in use in the cache server 130 until it is removed from the cache server 130. Alternatively, the cache service module 120 may return a null value, default data, or a "miss" signal to the application server 115.

After receiving the requested application data, the application server 115 may modify the application data in the course of performing an activity such as a command, functionality, or application. After the application server 115 is done with the modified application data, it may use the cache service module 120 to write the modified application data to a cache or database so that the modified application data may be used by the application server 115 or other application servers 110 at a later time. For example, the cache service module 120 may determine that application data is modified and the data interface module 210 of FIG. 2 may transmit the modified application data to the cache indicated by the location data, the database indicated by the location data, or both.

Although the embodiments described above involve an application server 115 using a cache service module 120 to request or store application data, an application server 115 is not necessary. For example, in other embodiments, a user device 105 may use the cache service module 120 to request or store application data, or the user device 105 may request or store application data directly with the appropriate cache or database.

An update server 145 may also be used in some embodiments to migrate the application data on the cache in the cache server 130 to the database 140. For example, application data that has been idle or not been used in over a certain period of time may be migrated to the database 140. The period of time may be predetermined or calculated dynamically. If the application data was modified by the user device 105 or application server 115, the update server 145 may also update an old version of the application data on the database 140 with the modified version of the application data stored on the cache in the cache server 130. In one embodiment the update server 145 may perform cache server maintenance actions, which include removing idle or inactive data, and transferring modified data from the cache service module 120 at configured intervals. In other embodiments, the update server 145 monitors the level of free memory reserved for the cache and performs maintenance on the cache when free memory reserved for the cache drops below a certain threshold.

If there is no location data associated with the instructions received from the user device 105, or if the location data is not valid, the cache service module 120 may assign a cache or cache server to the user device 105 or to the user. Similarly, the cache service module 120 may also assign a database or database server to the user device 105. The cache or database assigned to the user or user device 105 may be determined based on a set of routing rules. For example, the routing rules may use algorithms that determine an assigned cache or database based on a user identification or other unique identifier or a round robin method where each cache or database takes a turn in being assigned.

The cache service module 120 may then generate location data comprising a cache identifier, a database identifier, or both, and transmit the location data to the user device 105, where the user device 105 may store the location data. In one embodiment, the location data is transmitted to the user device 105 in a browser cookie. In another embodiment, the cache service module 120 may transmit the location data to a routing service to be stored by the routing service. This enables the routing service to look up the appropriate cache or database based on a routing identifier associated with a user or user device 105.

In some examples, a cache may stop functioning as a cache for the application data. For example, the cache server 130 maintaining the cache may be taken down for maintenance or permanently, or the application data may be moved to another cache for any number of reasons. In one embodiment, the cache server 130 may set the status of the cache to indicate that the cache is unavailable or that the application data has been moved to another cache. When an application server 115 requests the application data from the cache server 130, the cache server 130 may respond with an indication of the new cache to which the application data has been moved. For example, the cache server 130 may communicate new location data comprising a new cache identifier to the cache service module 120 of the application server 115. The cache service module 120 may then request the application data from the new cache corresponding to the new cache identifier. The cache service module 120 may also transmit the new location data to the user device 105 so that future instructions may include the updated location data. The cache server 130 or the cache service module 120 may also transmit the new location data to the routing service so the new cache may be identified in future transactions.

In one embodiment, if a cache server 130 maintaining a cache fails, the application data stored in the cache may be automatically distributed to the other cache servers 125. The application data stored in the cache may be distributed evenly such that the load of maintaining the application data and providing access to the application data is spread over the other cache servers 125.

A database 140 may also stop functioning as a storage location for the application data. In this embodiment, the database server maintaining the database 140 may set the status of the database 140 to indicate that the database 140 is down or that the application data has been moved to another database. When an application server 115 requests the application data from the database server, the database server may respond with an indication of the new database that the application data has been moved to. For example the database server may communicate new location data comprising a new database identifier to the cache service module 120 of the application server 115. The cache service module 120 may then request the application data from the new database corresponding to the new database identifier. The database server or the cache service module 120 may also transmit the new location data to the routing service so the new database may be identified in future transactions.

Figure 2:
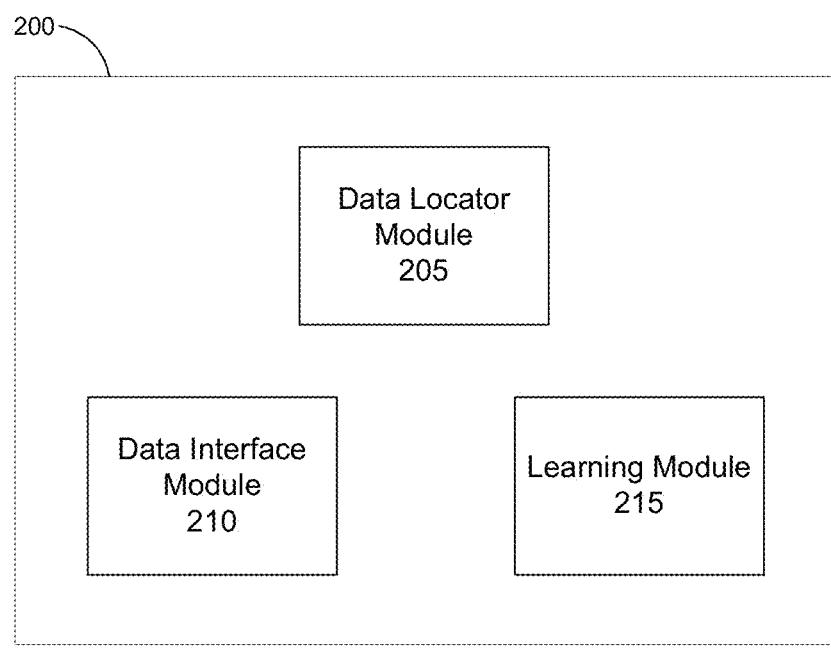
FIG. 2 is a block diagram illustrating a cache service module according to various embodiments.

FIG. 2 is a block diagram illustrating a cache service module according to various embodiments. The cache service module 200 may include a data locator module 205, a data interface module 210, and a learning module 215. The data locator module 205 may be used to determine on which cache or database application data associated with instructions from a user device 105 may reside. The data locator module 205 may also be used to communicate with a router service to determine which cache or database corresponds to a routing identifier. The data interface module 210 may be used to communicate with the one or more cache servers 125 and database servers. For example, the data interface module 210 may be used to request the application data from a cache server 130 or database server.

In one embodiment, the application server 115 may need several pieces of application data to perform an activity, such as a command, functionality, or application. A learning module 215 may be used to fetch the multiple pieces of application data in one transaction rather than as needed by the application server 115. For example, the learning module 215 may monitor the requests made by the application server 115 for pieces of application data, the instructions associated with those requests, and the characteristics of those instructions. The learning module 215 may identify a relationship or association between specific pieces of application data and the instructions, and when subsequent instructions of the same kind or sharing similar characteristics are received, the learning module 215 may cause the data interface module 210 to request the multiple pieces of application data associated with the instructions all at once. For example, before the logic to perform the activity is executed, the data interface module 210 may request and retrieve all of the pieces of application data associated with the instructions.

The monitoring may be performed during a learning cycle, during which pieces of application data are retrieved as needed by the cache service module 120. For example, when the application server 115 needs a first piece of application data to perform an activity, the cache service module 120 may make a request to the cache server 130 or database 140 for the first piece of application data and identify the first piece of application data as being associated with the activity. When the application server 115 needs a second piece of application data, the cache service module 120 may make a request to the cache server 130 or database 140 for the second piece of application data and identify the second piece of application data as being associated with the activity. This learning cycle may last for a predetermined duration. After the learning cycle is completed, the cache service module 120 may respond to subsequent instructions to perform an activity by requesting all pieces of application data that were identified by the learning module 215 as being associated with the activity, even if not all of the pieces of application data are immediately needed by the application server 115. If there is a piece of application data requested that is not identified as being associated with the activity, the cache service module 120 may retrieve the piece separately. The cache service module 120 may use several threads to retrieve the pieces of application data concurrently.

In another embodiment, the learning module 215 may compile and maintain a list of pieces of application data associated with an activity for each activity implemented by the application server 115, and the cache service module 120 may request all the pieces of application data on the list associated with the activity. In another embodiment, the cache service module 120 may cache the pieces of application data on the list into the cache. A list may also be used to cache pieces of application data during the learning cycle as it builds the list. For example, the cache service module 120 may request pieces of application data already on the list and add to the list requested pieces of application data not on the list.

Figure 3:
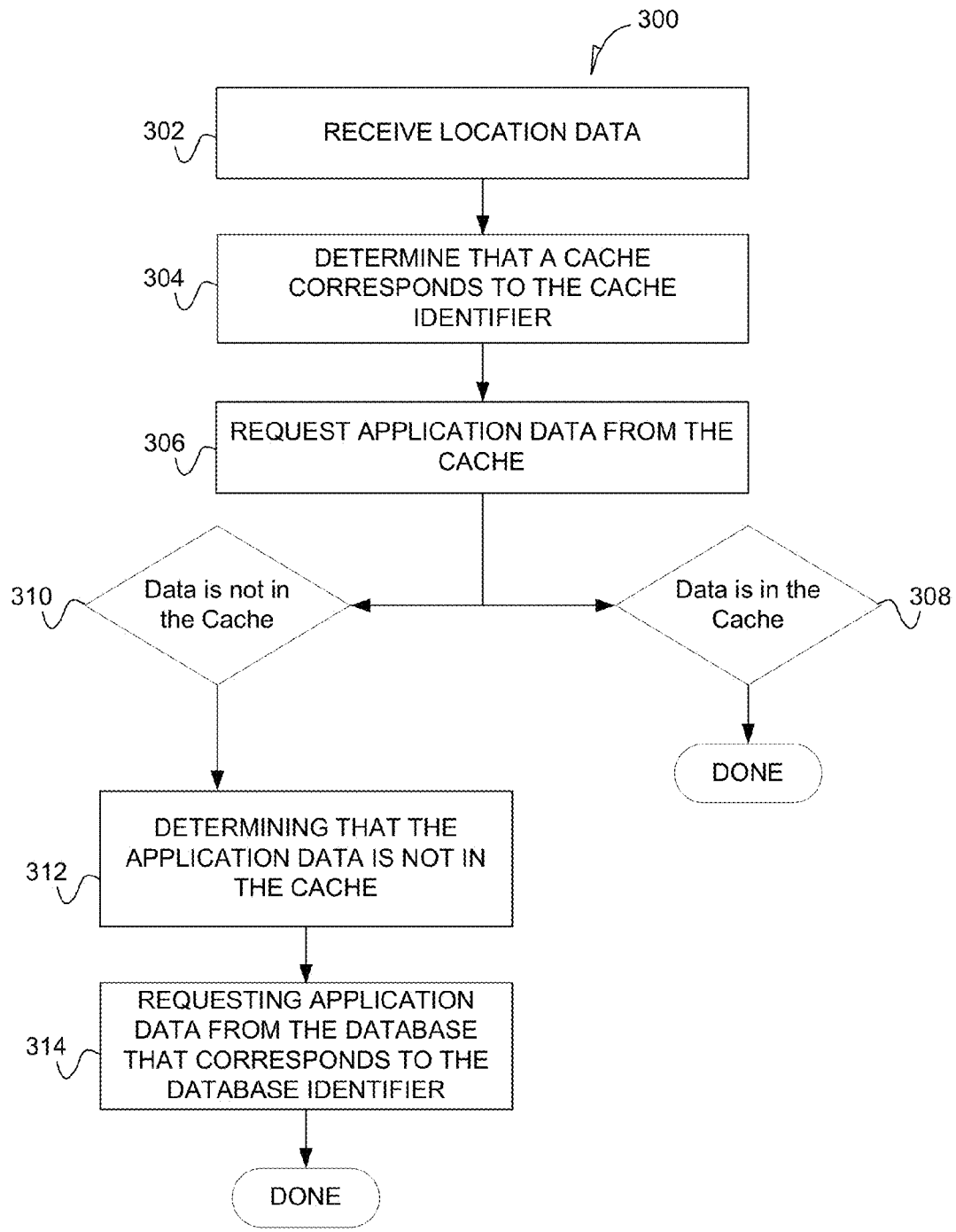
FIG. 3 is a flow diagram illustrating a method to request application data according to various embodiments.

FIG. 3 is a flow diagram illustrating a method 300 to request application data according to various embodiments. At operation 302, a cache service module such as cache service module 120 shown in FIG. 1 may receive location data from a user device 105 or an application server 115. The location data may be received along with instructions from the user device or an indication of application data to be requested. The location data may also be received in a separate communication. In one embodiment, the location data may include a cache identifier and/or a database identifier. The location data may also include a routing identifier that may be used to identify a cache or database.

A data locator module 205 may be used to determine a cache based on the location data. For example, at operation 304, the data locator module 205 may determine that one of the many caches corresponds to the cache identifier in the location data. If a routing identifier is provided in the cache identifier, the data locator module 205 may query a routing service located on the application server 115 or another server to look up the appropriate cache based on the routing identifier.

After identifying the cache that corresponds to the cache identifier, at operation 306, the data interface module 210 may request the application data from the cache that corresponds to the cache identifier. In one embodiment, a read set may be used to request and obtain only a subset of the application data associated with the location data such as the cache identifier or the routing identifier. A read set may be an identification of a subset of all of the application data associated with the location data. For example, a read set may identify one or more pieces of application data that are to be retrieved based on the location data and the instructions received.

If at operation 308 it is determined that the cache contains the requested application data, the cache or the cache server 130 that supports the cache may transmit the application data to the data interface module 210 for the application server 115 to use. If it is determined that the cache does not contain the requested application data, at operation 310 the cache server 130 may send the cache service module 120 a "miss" signal or other response indicating that the requested data is not on the cache server 130.

In response to receiving a response indicating that the requested data is not on the cache server 130, the data locator module 205 may determine, at operation 312, that the application data is not in the cache corresponding to the cache identifier. The data locator module may determine that one of the databases corresponds to the database identifier in the location data and, at operation 314, request the application data from that database. Or, if a routing identifier is provided in the location data, the data locator module 205 may query a routing service and look up the appropriate database based on the routing identifier. In this way, the cache service module 120 uses the location data to determine from which cache and which database to request application data.

Figure 4:
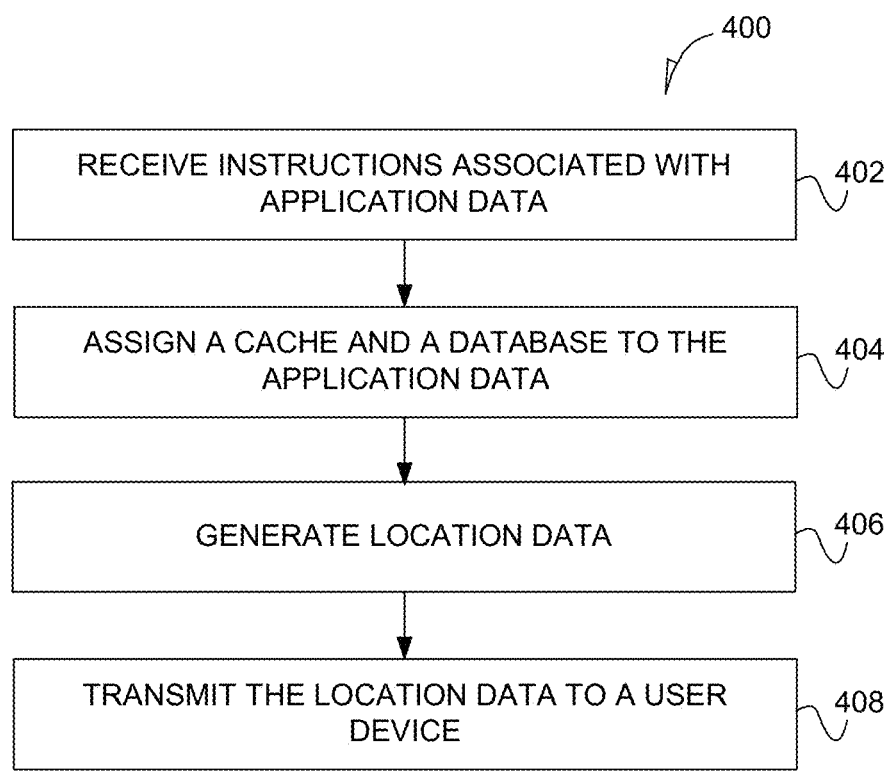
FIG. 4 is a flow diagram illustrating a method, according to an embodiment, to generate location data and transmit location data to a user device.

Location data may be stored in a user device 105 and transmitted to the application server 115 along with instructions to perform an activity. For example, FIG. 4 is a flow diagram illustrating a method 400, according to an embodiment, to generate location data and transmit location data to a user device 105. At operation 402, the application server 115 or cache service module 120 receives instructions associated with application data. If there is no existing location data associated with the instructions received from the user device, or if the location data is not valid, the data locator module 205 may, at operation 404, assign a cache and a database to the application data. Which cache or database is assigned to the data may depend on a set of predetermined routing rules.

At operation 406, the data locator module 205 may generate location data which is then transmitted to a user or user device 105 at operation 408. The location data may include a cache identifier, a database identifier, a routing identifier, or a combination of the above. A cache identifier may be used to identify a cache that stores the application data. Similarly, a database may be used to identify a database that stores the application data. A routing identifier may be used to look up a routing service to determine a cache and database that store the application data. The location data may be transmitted to the user or user device 105 in an electronic communication and stored on the user device. For example, in one embodiment, the location data is transmitted to the user device 105 in a browser cookie and stored by the browser on the user device 105.

In some embodiments, application data may be stored in a cache or database in the form of a dynamically modifiable subschema. For example, application data may be created based on metadata obtained from a local metadata configuration file or a configuration database server. The metadata may contain information about the characteristics of application data including, for example, application data type. The entry of a metadata record into a metadata configuration file or table may be all that is necessary for a new application data type or application data to be created and accessible and modifiable in the system without any code change or changes to the storage engine.

Figure 5:
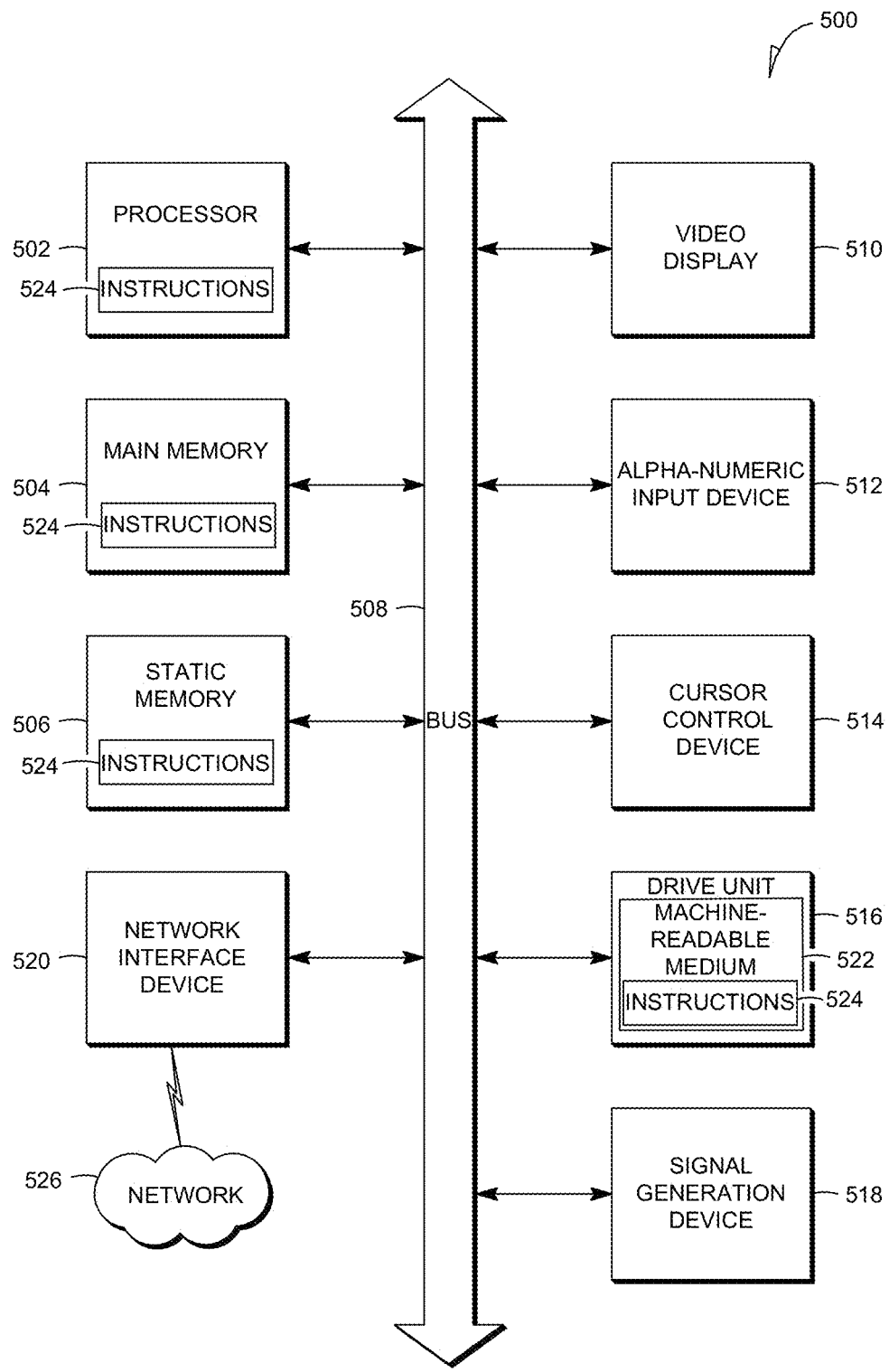
FIG. 5 is a block diagram illustrating a machine according to various embodiments.

FIG. 5 shows a diagrammatic representation of a machine in the example form of a computer system 500 within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU) a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a cursor control device 514 (e.g., a mouse), a disk drive unit 516, a signal generation device 518 (e.g., a speaker) and a network interface device 520.

The disk drive unit 516 includes a machine-readable medium 522 on which is stored one or more sets of instructions 524 (e.g., software) embodying any one or more of the methodologies or functions described herein. The instructions 524 may also reside, completely or at least partially, within the main memory 504 and/or within the processor 502 during execution thereof by the computer system 500, the main memory 504 and the processor 502 also constituting machine-readable media. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions 524. The term "machine-readable medium" shall also be taken to include any medium that is capable of storing, encoding or carrying a set of instructions for execution by the machine and that causes the machine to perform any one or more of the methodologies discussed above. The term "machine-readable medium" shall accordingly be taken to include, but not be limited to, solid-state memories, optical and magnetic media, and carrier wave signals.

Although the present invention has been described with reference to specific example embodiments, it will be evident that various modifications and changes may be made to these embodiments without departing from the broader spirit and scope of the invention. The various modules discussed may be implemented entirely in hardware, software, firmware, or a combination of these. Accordingly, the specification and drawings are to be regarded in an illustrative rather than a restrictive sense.

Some embodiments are configured to cache data in one or more cache servers between the one or more application servers and one or more databases to reduce the amount of requests to the one or more databases and thus reduce the number of databases that may be required to handle the requests to access and/or modify data. The embodiments may be configured to improve, for example, affordable scalability. For example, additional applications servers, cache servers, and databases may be included in the system based on need.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   receiving a cookie comprising location data from a user device, the location data comprising a cache identifier, the cache identifier identifying a cache of a plurality of caches, each cache of the plurality of caches comprising a plurality of addressable storage locations that contain application data;
   deriving, using a processor, a location of the cache of the plurality of caches based on the cache identifier; and
   requesting application data from the cache based on the derived location;
   wherein the location data comprises a database identifier, the method further comprising:
   determining that the requested application data is not stored in the cache corresponding to the cache identifier; and
   requesting the requested application data from a database of a plurality of databases based on the determination, the database corresponding to the database identifier.

2. The method of claim 1, wherein the location data is received in a browser cookie.

3. The method of claim 1, wherein the cache identifier comprises a routing identifier, and wherein the deriving a location of the cache of the plurality of caches comprises:
   querying a routing service with the routing identifier; and
   receiving a second identification of the cache.

4. The method of claim 1, further comprising:
   modifying the requested application data; and
   transmitting the modified application data to the cache corresponding to the cache identifier.

5. The method of claim 1, further comprising:
   receiving new location data from a cache server hosting a cache, the new location data comprising a new cache identifier;
   requesting application data from a second cache of the plurality of caches, the second cache corresponding to the new cache identifier; and
   transmitting the new location data to a client browser in a cookie.

6. The method of claim 1, further comprising:
   monitoring requests for application data associated with instructions having a set of characteristics;
   compiling a list of application data associated with the instructions having the set of characteristics;
   receiving subsequent instructions sharing the set of characteristics; and
   requesting, based on the receiving of the subsequent instructions, the application data on the list.

7. The method of claim 1, wherein the requested application data comprises session data.

8. A system comprising:
   a cache service module to receive location data from a user device, the location data comprising a cache identifier, the cache identifier identifying a cache of a plurality of caches, each cache of the plurality of caches comprising a plurality of addressable storage locations that contain application data:
   a data locator module to derive a location of the cache of the plurality of caches based on the cache identifier, the data locator module comprising at least one hardware device; and
   a data interface module to request application data from the cache based on the derived location;

wherein the location data comprises a database identifier and wherein:
the data locator module is to:
determine that the requested application data is not stored in the cache corresponding to the cache identifier, and
determine that a database of a plurality of databases corresponds to the database identifier; and
the data interface module is to request the requested application data from the database corresponding to the database identifier.

9. The system of claim 8, wherein the cache service module receives the location data in a browser cookie.

10. The system of claim 8, wherein the cache identifier comprises a routing identifier, and wherein the data locator module is to:
query a routing service with the routing identifier; and
receive a second identification of the cache.

11. The system of claim 8, wherein:
the cache service module is to determine that the requested application data has been modified; and
the data interface module is to transmit the modified application data to the cache corresponding to the cache identifier.

12. The system of claim 8, wherein:
the data interface module is to:
receive new location data from a cache server hosting a cache, the new location data comprising a new cache identifier, and
request application data from a second cache of the plurality of caches, the second cache corresponding to the new cache identifier; and
wherein the cache service module is to transmit new location data to a client browser in a cookie.

13. The system of claim 8, further comprising:
a learning module to:
monitor requests for application data associated with instructions having a set of characteristics, and
compile a list of application data associated with instructions having the set of characteristics;
wherein the cache service module is to receive subsequent instructions, the subsequent instructions sharing the set of characteristics; and
the data interface module is to request, based on the receiving of the subsequent instructions, the application data on the list.

14. The system of claim 8, wherein the requested application data comprises session data.

15. A non-transitory machine-readable medium comprising instructions, which, when executed by one or more processors, cause one or more machines to perform operations comprising:
receiving a cookie comprising location data from a user device, the location data comprising a cache identifier, the cache identifier identifying a cache of a plurality of caches, each cache of the plurality of caches comprising a plurality of addressable storage locations that contain application data;
deriving a location of the cache of the plurality of caches based on the cache identifier; and
requesting application data from the cache based on the derived location;
wherein the location data comprises a database identifier, the instructions further comprising:
determining that the requested application data is not stored in the cache corresponding to the cache identifier; and
requesting the requested application data from a database of a plurality of databases based on the determination, the database corresponding to the database identifier.

16. A method comprising:
receiving instructions to perform an activity associated with application data;
receiving a browser cookie from a user device, the browser cookie comprising a routing identifier;
querying a routing service with the routing identifier;
receiving an identification of a cache; and
requesting the application data from the cache based on the identification of the cache;
wherein the routing identifier comprises a database identifier, the method further comprising:
determining that the requested application data is not stored in the cache corresponding to the identification of the cache; and
requesting the requested application data from a database of a plurality of databases based on the determination, the database corresponding to the database identifier.

17. The method of claim 1, wherein each cache of the plurality of caches is distinguished from each of one or more remaining caches of the plurality of caches by at least one different access route.

18. The system of claim 8, wherein each cache of the plurality of caches is distinguished from each of one or more remaining caches of the plurality of caches by at least one different access route.

19. The non-transitory machine-readable medium of claim 15, wherein each cache of the plurality of caches is distinguished from each of one or more remaining caches of the plurality of caches by at least one different access route.

* * * * *

UNITED STATES PATENT AND TRADEMARK OFFICE
CERTIFICATE OF CORRECTION

PATENT NO. : 8,799,409 B2  Page 1 of 1
APPLICATION NO. : 12/688732
DATED : August 5, 2014
INVENTOR(S) : Kasten et al.

It is certified that error appears in the above-identified patent and that said Letters Patent is hereby corrected as shown below:

In the Claims

Column 10, line 56, Claim 8, after "receive", insert --a cookie comprising--, therefor Column 10, line 61, Claim 8, delete "data:" and insert --data;--, therefor Signed and Sealed this
Twenty-fifth Day of November, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,799,409 B2 | Page 1 of 1 |
| APPLICATION NO. | : 12/688732 | |
| DATED | : August 5, 2014 | |
| INVENTOR(S) | : Kasten et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 881 days.

Signed and Sealed this
Twenty-eighth Day of July, 2015

Michelle K. Lee
*Director of the United States Patent and Trademark Office*